(12) United States Patent
Rossano et al.

(10) Patent No.: US 9,552,807 B2
(45) Date of Patent: Jan. 24, 2017

(54) METHOD, APPARATUS AND SYSTEM FOR REGENERATING VOICE INTONATION IN AUTOMATICALLY DUBBED VIDEOS

(71) Applicant: Video Dubber LTD., Tel Aviv (IL)

(72) Inventors: Boaz Rossano, Tel Aviv (IL); Jacob Dvir, Be'er Ya'akov (IL)

(73) Assignee: Video Dubber LTD., Tel Aviv (IL)

( * ) Notice: Subject to any disclaimer, the term of this patent is extended or adjusted under 35 U.S.C. 154(b) by 0 days.

(21) Appl. No.: 14/771,905

(22) PCT Filed: Mar. 11, 2014

(86) PCT No.: PCT/IB2014/059612
§ 371 (c)(1),
(2) Date: Sep. 1, 2015

(87) PCT Pub. No.: WO2014/141054
PCT Pub. Date: Sep. 18, 2014

(65) Prior Publication Data
US 2016/0021334 A1    Jan. 21, 2016

Related U.S. Application Data

(60) Provisional application No. 61/775,839, filed on Mar. 11, 2013.

(51) Int. Cl.
*G10L 13/08* (2013.01)
*G10L 15/26* (2006.01)
(Continued)

(52) U.S. Cl.
CPC ............ *G10L 13/08* (2013.01); *G10L 13/033* (2013.01); *G10L 15/26* (2013.01); *H04N 5/278* (2013.01); *H04N 5/9305* (2013.01)

(58) Field of Classification Search
None
See application file for complete search history.

(56) References Cited

U.S. PATENT DOCUMENTS 5,737,725 A * 4/1998 Case .................. G06Q 30/0601
704/213
6,088,673 A * 7/2000 Lee ......................... G10L 13/00
704/260

(Continued)

FOREIGN PATENT DOCUMENTS

WO    2004093078 A1    10/2004

OTHER PUBLICATIONS

International Search Report in PCT/IB2014/059612 dated Jul. 3, 2014.

(Continued)

*Primary Examiner* — Douglas Godbold
(74) *Attorney, Agent, or Firm* — Manelli Selter PLLC; Edward J. Stemberger

(57) ABSTRACT

A system and method for automatically dubbing a video in a first language into a second language, comprising: an audio/video pre-processor configured to provide separate original audio and video files of the same media; a text analysis unit to receive a first text file of the video's subtitles in the first language and a second text file of the video's sub-titles in the second language, and re-divide them into text sentences; a text-to-speech unit to receive the text sentences in the first and second languages from the text analysis unit and produce therefrom first and second standard TTS spoken sentences; a prosody unit to receive the first and second spoken sentences, the separated audio file and timing parameters and produce therefrom dubbing recommendations; and a dubbing unit configured to receive the second spoken sentence and the recommendations and pro- (Continued)

duce therefrom an automatically dubbed sentence in the second language.

24 Claims, 10 Drawing Sheets

(51) Int. Cl.
*H04N 5/278* (2006.01)
*G10L 13/033* (2013.01)
*H04N 5/93* (2006.01)

(56) References Cited

U.S. PATENT DOCUMENTS

| | | | |
|---|---|---|---|
| 2002/0087569 A1 | 7/2002 | Fischer et al. | |
| 2003/0046075 A1* | 3/2003 | Stone | G06F 17/2809 704/257 |
| 2003/0216922 A1* | 11/2003 | Gonzales | G06F 17/289 704/260 |
| 2005/0114137 A1 | 5/2005 | Saito et al. | |
| 2006/0285654 A1* | 12/2006 | Nesvadba | G06F 17/27 379/67.1 |
| 2007/0106516 A1* | 5/2007 | Larson | G10L 13/033 704/270 |
| 2008/0195386 A1* | 8/2008 | Proidl | G10L 13/033 704/235 |
| 2009/0037179 A1 | 2/2009 | Liu et al. | |
| 2009/0299748 A1 | 12/2009 | Basson et al. | |
| 2011/0243447 A1* | 10/2011 | Meulenbroeks | G10L 13/00 382/182 |
| 2014/0053223 A1* | 2/2014 | Vorobyov | G10L 13/00 725/110 |
| 2015/0154183 A1* | 6/2015 | Kristjansson | G06F 17/289 704/3 |

OTHER PUBLICATIONS

Kumar et al., "Speaker Recognition Using GMM", International Jounel of Engineering Science and Technology, 2010, 2428-2436, vol. 2(6).

Lennes, "Hands on Tutorial: Using Praat for analyzing a speech corpus", Department of Speech Sciences, University of Helsinki, 2005.

* cited by examiner

VIDEO DUBBER APPLICATION 201

TRUDUB ENGINE 202
(Dub Linguistic / Prediction Engine)

203   203   203   203

SPEECH API (MS OR OTHER) 204

OS – WINDOWS (XP-7) + .NET 3.5 / WPF 205

Fig. 2

METHOD, APPARATUS AND SYSTEM FOR REGENERATING VOICE INTONATION IN AUTOMATICALLY DUBBED VIDEOS

CROSS-REFERENCE TO RELATED PATENT APPLICATIONS

This patent application claims priority from and is related to U.S. Provisional Patent Application Ser. No. 61/775,839, filed Mar. 11, 2013, this U.S. Provisional Patent Application incorporated by reference in its entirety herein.

TECHNOLOGY FIELD

The present invention is in the field of video dubbing and more specifically automatic dubbing.

BACKGROUND

Today (2013) over 75% of the content broadcasted over TV all over the world, is originally produced in English and over 90% of the population globally doesn't speak English. The existing solutions are either subtitles in various languages or manual dubbing of the videos using human actors.

Published US application no. 20060285654 provides a system for performing automatic dubbing on an incoming audio-visual stream. The system comprises means for identifying the speech content in the incoming audio-visual stream, a speech-to-text converter for converting the speech content into a digital text format, a translating system for translating the digital text into another language or dialect; a speech synthesizer for synthesizing the translated text into a speech output, and a synchronizing system for synchronizing the speech output to an outgoing audio-visual stream.

Published US application no. 20080195386 provides a method and a device for performing an automatic dubbing on a multimedia signal, such as a TV or a DVD signal, where the multimedia signal comprises information relating to video and speech and further comprises textual information corresponding to the speech. Initially the multimedia signal is received by a receiver. The speech and the textual information are then, respectively, extracted which results in said speech and textual information. The speech is analyzed resulting in at least one voice characteristic parameter, and based on the at least one voice characteristic parameter the textual information is converted to a new speech.

SUMMARY

In a first aspect of the present invention there is provided a system for automatically dubbing a video in a first language into a second language, comprising: an audio/video pre-processor configured to provide separate original audio and video files of the same media; a text analysis unit configured to receive a first text file of the video's subtitles in the first language and a second text file of the video's subtitles in the second language, and re-divide them into text sentences; a text-to-speech unit configured to receive the text sentences in the first and second languages from the text analysis unit and produce therefrom first and second standard TTS spoken sentences; a prosody unit configured to receive the first and second spoken sentences, the separated audio file and timing parameters and produce therefrom dubbing recommendations; and a dubbing unit configured to receive the second spoken sentence and the recommendations and produce therefrom an automatically dubbed sentence in the second language.

The system may further comprise a speech-to-text unit configured to convert the audio file into the first text file.

The system may further comprise a feelings intonations library and be further configured to find a match for the intonation in the original audio sentence in the library and attach feeling descriptors to the recommendations.

The dubbing unit may further be configured to perform asymmetric time adjustments to the dubbed sentence.

The asymmetric time adjustments may comprise different scaling factors for words and gaps between words.

The system may further comprise a translation unit configured to provide the second language text sentences.

The video may comprise closed 'burned' captions and the system may further comprise an OCR unit configured to recognize the 'burned' captions and create therefrom a text file.

In another aspect of the present invention there is provided a real-time automatic video dubbing system incorporated in a media player, comprising: an audio/video pre-processor configured to provide separate original audio and video files of the same media; a text analysis unit configured to receive a first text file of the video's subtitles in a first language and a second text file of the video's subtitles in a second language, the text analysis unit further configured to re-divide the first and second text files into text sentences; a text-to-speech unit configured to receive the text sentences in the first and second languages from the text analysis unit and produce therefrom first and second standard TTS spoken sentences; a prosody unit configured to receive the first and second spoken sentences, the separated audio file and timing parameters and produce therefrom dubbing recommendations; and a dubbing unit configured to receive the second spoken sentence and the recommendations, produce therefrom an automatically dubbed sentence in the second language, decrease the volume of the original audio and play the dubbed sentence.

In a further aspect of the present invention there is provided a system for automatically dubbing a video in a first language into a second language, comprising: an audio/video pre-processor configured to provide separate original audio and video files of the same media; a text analysis unit configured to receive a first text file of the video's subtitles in the first language and a second text file of the video's subtitles in the second language, the text analysis unit further configured to re-divide the first and second text files into text sentences; a plurality of text-to-speech (TTS) units configured to receive different allocations of the text sentences in the first and second languages from the text analysis unit and produce therefrom first and second standard TTS spoken sentences; a plurality of respective prosody units configured to receive from their respective TTS units the first and second spoken sentences, the separated audio file and timing parameters and produce therefrom dubbing recommendations; a plurality of respective dubbing units configured to receive the second spoken sentences from their respective prosody units and the recommendations and produce therefrom a plurality of automatically dubbed sentences in the second language; an audio/video post-processing unit configured to assemble the dubbed sentences from the plurality of dubbing units in a correct order; and a mixing unit configured to merge the assembled dubbed sentences with the original video.

In a further aspect of the present invention there is provided a system for automatically dubbing a video in a first language into a plurality of second languages, comprising: an audio/video pre-processor configured to provide separate original audio and video files of the same media; a text analysis unit configured to receive a first text file of the video's subtitles in the first language and a plurality of second text files of the video's subtitles in the plurality of second languages, the text analysis unit further configured to re-divide the first and second text files into text sentences; a plurality of text-to-speech (TTS) units, each configured to receive the text sentences in the first language and in one of the second languages from the text analysis unit and produce therefrom first and second standard TTS spoken sentences; a plurality of respective prosody units configured to receive from their respective TTS units the first and second spoken sentences, the separated audio file and timing parameters and produce therefrom dubbing recommendations; a plurality of respective dubbing units configured to receive the second spoken sentences from their respective prosody units and the recommendations and produce therefrom a plurality of automatically dubbed sentences in the second language; and a plurality of mixing units configured to merge the assembled dubbed sentences with the original video.

In a further aspect of the present invention there is provided a method of automatically dubbing a video in a first language into a second language, comprising: providing separate original audio and video files of the same media; receiving a first text file of the video's subtitles in the first language and a second text file of the video's subtitles in the second language and dividing the first and second text files into text sentences; producing first and second standard TTS spoken sentences from the first and second language sentences; producing dubbing recommendations from the first and second spoken sentences, the separated audio file and timing parameters; and producing an automatically dubbed sentence in the second language from the second spoken sentence and the recommendations.

The method may further comprise converting the audio file into the first text file.

Producing dubbing recommendations may comprise comparing the sentence in the first TTS voice with the sentence in the original audio.

The dubbing recommendations may comprise at least one of: volume, intonation, speed, audio distribution, timestamp, gender and actor.

The method may further comprise finding a match for the intonation in the original audio sentence in a feelings intonations library and attaching feeling descriptors to the recommendations.

The method may further comprise performing asymmetric time adjustments to the dubbed sentence.

The asymmetric time adjustments may comprise different scaling factors for words and gaps between words.

The method may further comprise providing the second language text sentences from a translation unit.

The video may comprise closed 'burned' captions and the method may further comprise recognizing the 'burned' captions and creating therefrom a text file.

In a further aspect of the present invention there is provided, in a media player, a method of real-time automatic video dubbing, comprising: providing separate original audio and video files of the same media; receiving a first text file of the video's subtitles in a first language and a second text file of the video's subtitles in a second language and re-divide the first and second text files into text sentences; producing first and second standard TTS spoken sentences from the text sentences in the first and second languages; producing dubbing recommendations from the first and second spoken sentences, the separated audio file and timing parameters; automatically producing a dubbed sentence in the second language from the second spoken sentence and the recommendations; and decreasing the volume of the original audio and playing the dubbed sentence.

In a further aspect of the present invention there is provided a method of automatically dubbing a video in a first language into a second language, comprising: providing separate original audio and video files of the same media; receiving a first text file of the video's subtitles in the first language and a second text file of the video's subtitles in the second language and dividing the first and second text files into text sentences; dividing said text sentences in the first and second languages between a plurality of parallel text-to-speech (TTS) processes and producing therefrom a plurality of first and second standard TTS spoken sentences; producing in parallel a plurality of dubbing recommendations from the plurality of first and second spoken sentences, the separated audio file and timing parameters; producing a plurality of automatically dubbed sentences in the second language from the plurality of second spoken sentences and the plurality of dubbing recommendations; assembling the plurality of dubbed sentences in a correct order; and merging the assembled dubbed sentences with the original video.

In a further aspect of the present invention there is provided a method of automatically dubbing a video in a first language into a plurality of second languages, comprising: providing separate original audio and video files of the same media; receiving a first text file of the video's subtitles in the first language and a plurality of second text files of the video's subtitles in the plurality of second languages and dividing the first and second text files into text sentences; producing in parallel a plurality of first and second standard TTS spoken sentences from the text sentences in the first language and in the second languages; producing in parallel a plurality of dubbing recommendations from the first and second spoken sentences, the separated audio file and timing parameters; producing in parallel a plurality of automatically dubbed sentences in the second languages from the second spoken sentences and the recommendations; and merging in parallel the assembled dubbed sentences with the original video.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 illustrates an exemplary embodiment of architecture for an apparatus for automatic dubbing on a desktop PC running Microsoft Windows, in accordance with some embodiments of the invention;

DETAILED DESCRIPTION

The present invention provides a system and method for converting media such as movies, video, pod-cast, audiobook, radio shows etc. in one language into movies in another language (with new dubbed voices recorded on their sound track).

The method may be carried out using a remote server or in a local configuration as an apparatus with a media player built-in (like a DVD player, etc.) or as a software component integrated into a standard media player (running on a desktop computer or a tablet, e.g. Windows Media Player) for playing videos with automated dubbing, that regenerates voice intonation, volume, etc.

Figure 1:
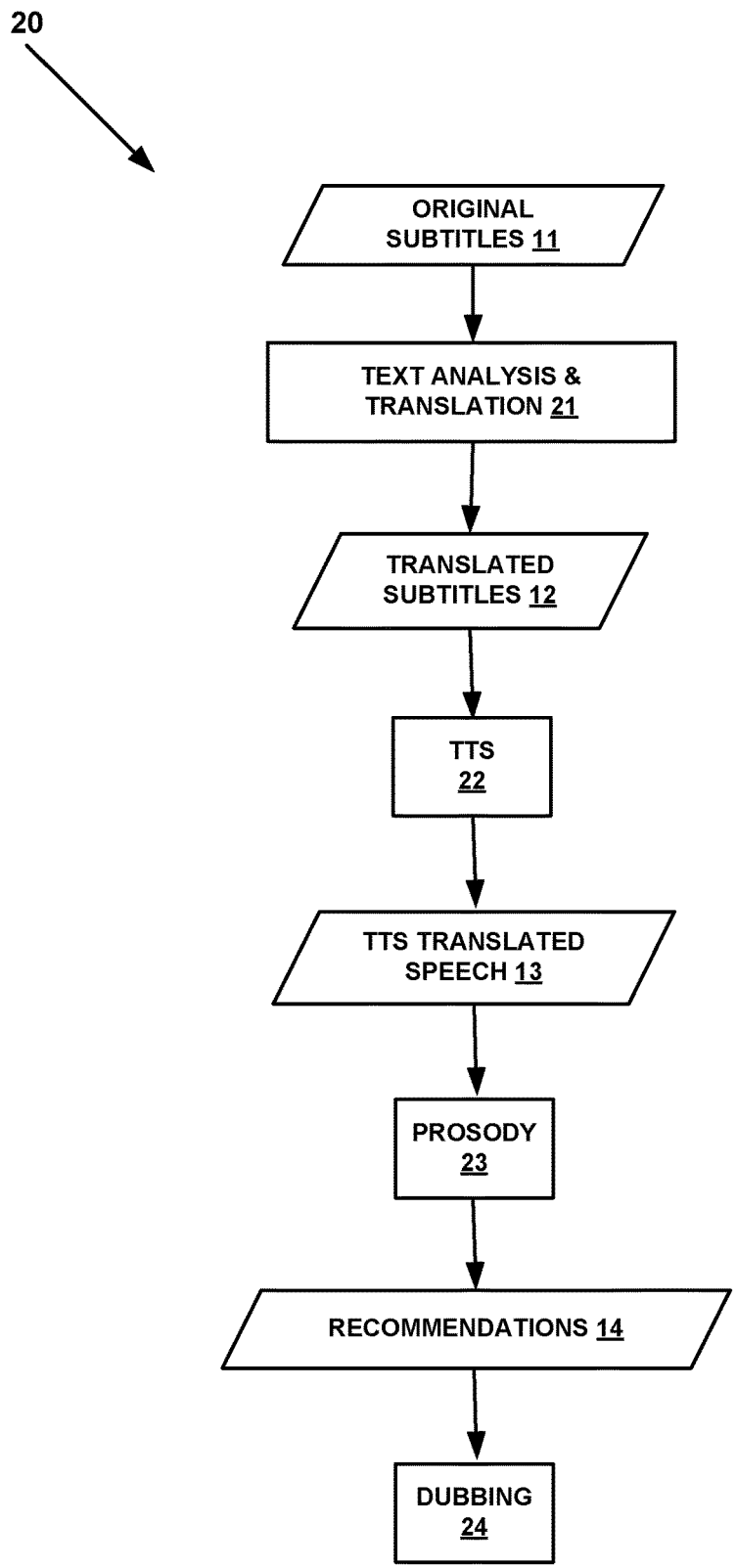
FIG. 1 is a block diagram showing the main components in an apparatus for automatic dubbing, in accordance with some embodiments of the invention.

FIG. 1 is a block diagram 20 showing the main components of a basic system for automatic dubbing, in accordance with some embodiments of the invention. The system 20 is suitable for real time application running on low-resource devices, where video and text data are received in streaming mode (e.g. YouTube vide, sport event, etc.) and the text data is dubbed in real time.

The system 20 comprises:

A Text Analysis Unit 21 for receiving the original subtitles text file 11 e.g. from YouTube API, along with its timing data, receiving from the user a target language selection, translating the subtitle into the target language (e.g. using Google Translate) and passing the translated subtitle text 12 to the TTS (Text To Speech) Generation Unit 22.

A TTS (Text To Speech) Generation Unit 22 that generates a standard TTS audio of the target language subtitle text 13 and passes them to the Prosody Analysis Unit 23.

A Prosody Analysis Unit 23 that uses the timing of the TTS translated speech 13, and the received timing of the original subtitle to recommend adjustments 14 that should be done to the final dubbed voice in terms of stretching/shrinking and speed of dubbing. These adjustment recommendations are passed to the Dubbing Unit 24.

A Dubbing Unit 24 that implements the recommendations 14 on the TTS translated speech 13.

Figure 1A:
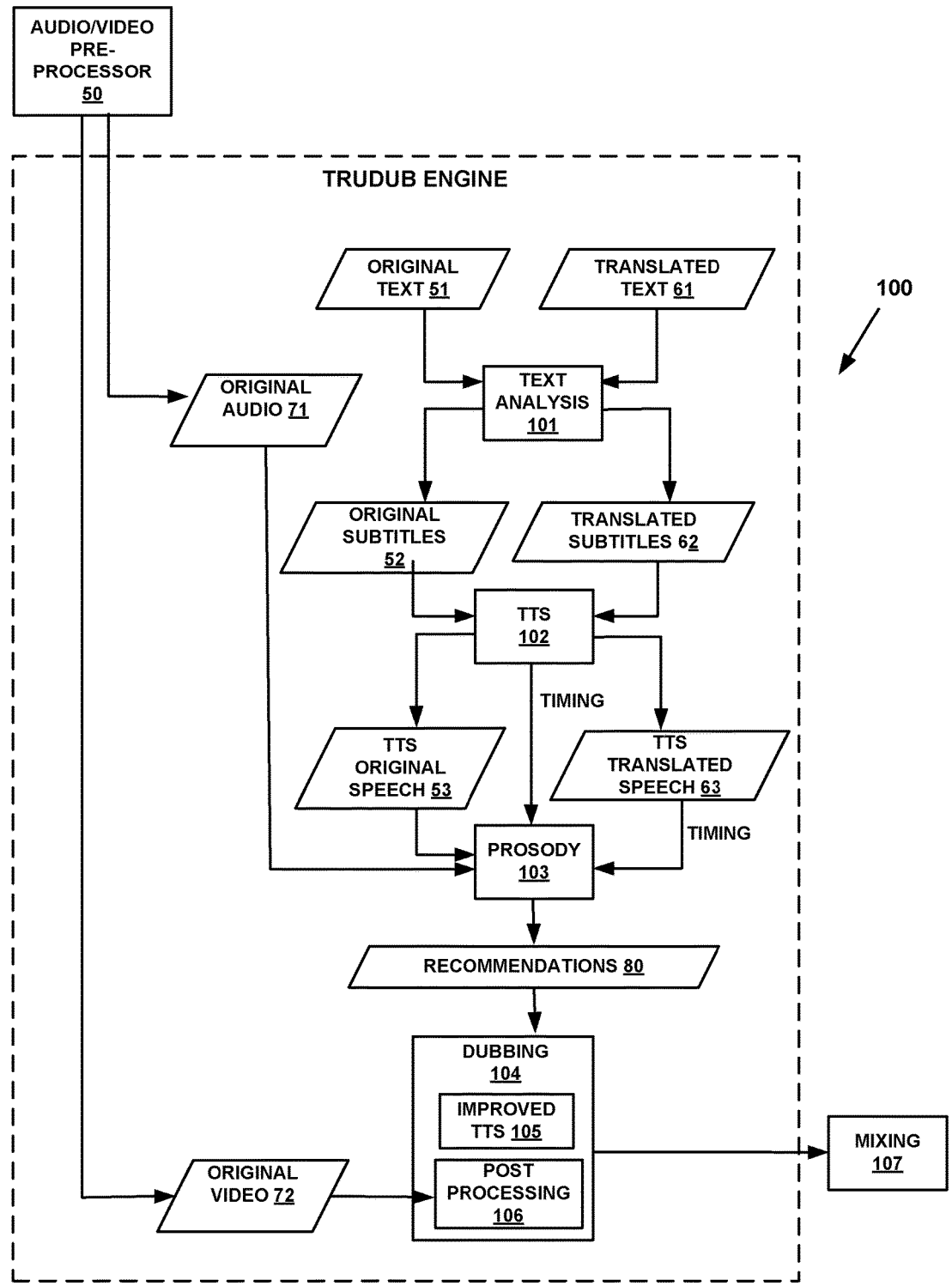
FIG. 1A is a block diagram showing the main components in an apparatus for automatic dubbing, in accordance with some embodiments of the invention.

FIG. 1A is a block diagram 100 showing the main components of a system for automatic dubbing, in accordance with some embodiments of the invention.

The system 100 is suitable for real time application running on high-resource devices, or for offline dubbing applications.

The system 100 comprises:

An audio/video pre-processor unit 50 for separating the original data into separate audio 71 and video files.

A Text Analysis Unit 101 for loading the subtitles text files both in the original language of the video 51, and in the target language to which the video should be dubbed 61, analyzing the subtitle files, and identifying a sentence comprising the next subtitle text (which can be one or more lines of text) and passing appropriate text segment (52, 62) from both files (languages) to the TTS (Text To Speech) Generation Unit 102.

A TTS (Text To Speech) Generation Unit 102 that generates a standard TTS audio that serves as a neutral baseline of the same sentence in both languages (53, 63) and passes them to the Prosody Analysis Unit 103.

A Prosody Analysis Unit 103 that performs comparison of the audio of the neutral baseline TTS voice (generated from the original language text) 53 and the voice being spoken within the video 71. Using this comparison and the timing of the TTS translated speech 63, the Prosody Analysis Unit 103 recommends adjustments 80 that should be done to the final dubbed voice, including the right volume (to mimic a specific emphasis, or the overall volume of the spoken sentence), intonation (the trend of the pitch), speed, distribution of the audio (on the 5.1, or more, channels of surround audio), gender, actor, exact speech beginning timing, etc. The intonation (speed, volume, pitch, etc.) in the original language TTS voice sound segment generated from the original language sentence may be compared to an original language's feeling intonations library and if there is a high level of confidence of a match, a 'feeling descriptor' may be attached to the recommendations, in order to render the sentence with a pre-set intonation, which is based on the localized feeling/intonation library. These adjustment recommendations are passed to the Dubbing Unit 104.

A Dubbing Unit 104 that comprises an improved TTS sub-unit 105 and a post-processing unit 106. In the real-time embodiment of the present invention, the improved TTS unit 105 decreases the overall volume of the video's original sound track (especially within the range of human voice, i.e. 60 hz-7 khz) during the dubbing, and 'speaks' the local language text, using a standard TTS engine (like Microsoft Windows SAPI, that is capable of modulating the voice, as well as pacing on demand), a localized voice (e.g. Acapela Group's Castilian Spanish voice, 'Antonio'), adjusted with the recommendations made by the Prosody Analysis Unit 103, on top of the video's audio, using the relevant TTS voice. Post-processing unit 106 may be used to perform some additional adjustments such as, for example, adjusting the gaps between dubbed words to comply with the given timing, as described in detail below.

Asymmetric Time Adjustments for Automated Dubbing

When dubbing a movie from a short duration language to a long duration language (e.g. an English movie dubbed to German) or from long to short (e.g. German to English), the target language speech audio usually needs to be time adjusted (stretched or shrunk) to fit in with the original movie's timing.

Simple homogeneous time stretching or shrinking isn't usually good enough, and when squeezed or stretched to more than 20% from the TTS output, distortions and artifacts might appear in the resulting audio (post the TTS).

In order to minimize these distortions, the adjustments should not be homogeneous, but rather manipulate the gaps between words on a different scale than that used on the actual said words made with the TTS. This can be done by directing the speech TTS engine to shorten or widen the gaps before pronouncing the sentence, and/or it can be done in the post process phase (by analyzing the resulting target language's audio track signal for segments with volume lower than −60 dB, and minimizing, eliminating or widening their length by a major factor, e.g. by 80%) and then time adjusting (stretching or shrinking) the resulting audio track by a lower factor (e.g. only 10%), because the overall audio now needs less squeezing in order to fit the available movie timing.

A mixing unit 107 that merges the new created audio track into the original movie.

Figure 1B:
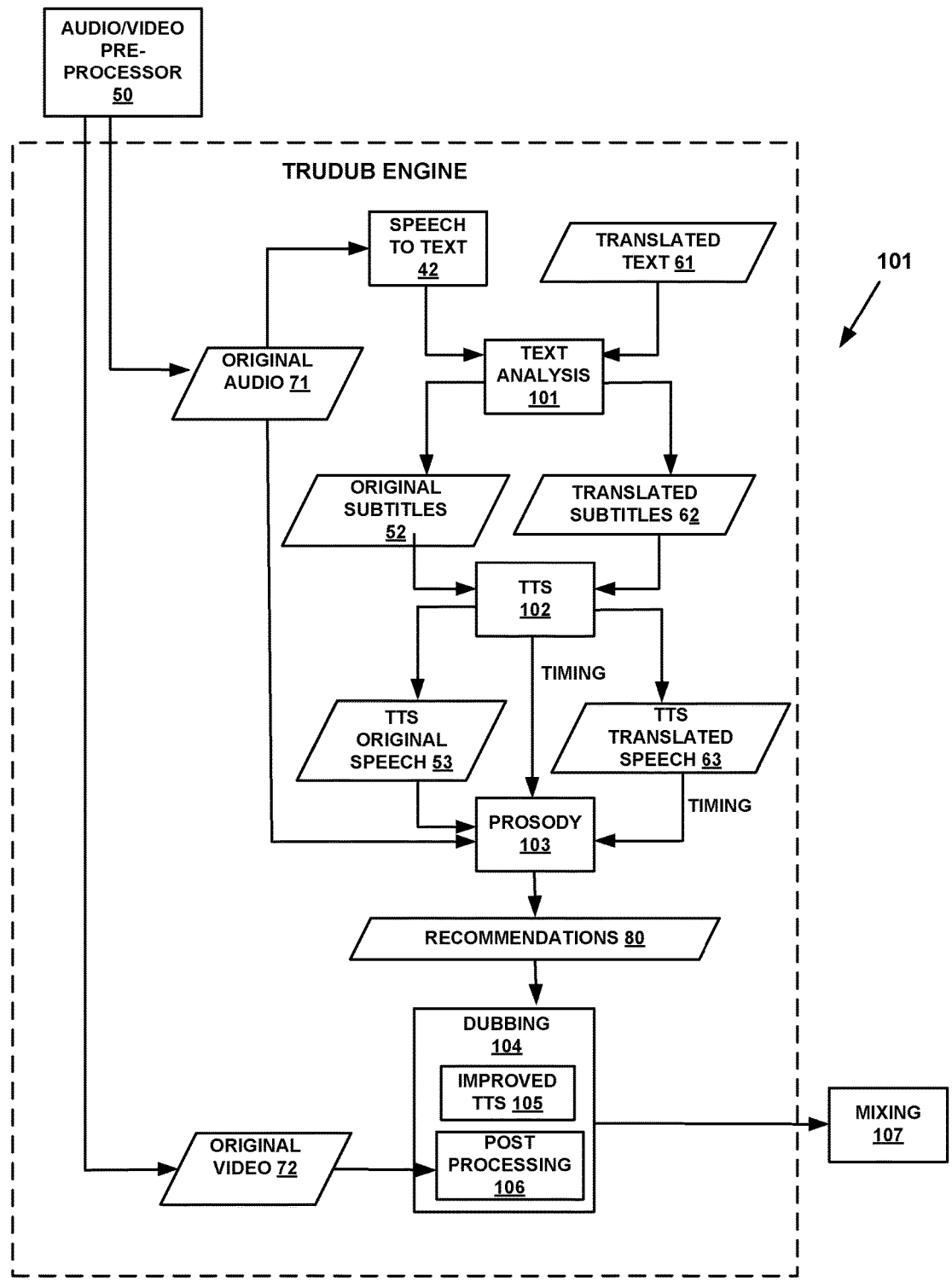
FIG. 1B is a block diagram showing the main components in an apparatus for automatic dubbing, in accordance with some embodiments of the invention.

In another embodiment 101 of the present invention, as schematically shown in FIG. 1B, the original language subtitles file may be replaced by a speech recognition module 42 that transcribes the video segment from the beginning of the timing of the next subtitle till the end of it (as marked in the translated language subtitles file).

In yet another embodiment of the present invention, as used for live TV broadcasts with pre-translated closed subtitles, the video playback may be continuously delayed for approximately one minute, during the entire broadcast. During the delay, a standard Speech-to-Text module is run, to regenerate the text lines from the video sound track, and compare with the translated closed subtitles. Once the original language subtitle line is generated, the analysis is performed and the delayed video is dubbed.

In yet another embodiment of the present invention, the pre-translated subtitles may be replaced by sending the closed subtitles to a local translation unit, or by using a remote translation unit (e.g. the Google Translate service—http://translate.google.com).

In yet another embodiment of the present invention, the local language subtitles file may be replaced by closed captions 'burned' on the video. The captions are provided to an OCR engine to recognize the text on the screen, which is then transcribed and time-stamped.

In yet another embodiment of the present invention, the video may comprises 'burned' closed captions in a language other than the local language. The captions are provided to an OCR engine to recognize the text on the screen, which is then transcribed, time-stamped, translated and dubbed.

In yet another embodiment of the present invention, the speech engine's voice may be somewhat shifted in time, e.g. adding or subtracting up-to 1 second in the beginning of the sentence, in order for the synthesized voice to better match the open vowels on the actor's mouth (based on a face recognition software API, e.g. http://face.com or Cognitec's FaceVACS http://www.cognitec-systems.de/FaceVACS-PortraitAcquisition.15.0.html). The matching process is done by the post-processing unit which analyses the original video 72.

FIG. 2 illustrates an exemplary embodiment of architecture for an apparatus for automatic dubbing in real time, on a desktop PC running Microsoft Windows, in accordance with some embodiments of the invention, comprising the following exemplary modules:

Operating System layer 205, e.g. Microsoft Windows (XP SP2 or higher), running the Microsoft .Net 3.5 (or higher) environment with WPF (Windows Presentation Foundation). It is understood that Windows, .Net and WPF are a choice of running platform, and a product could be developed on a simpler architecture (e.g. Android, iOS, etc. with alternative development environments like C++, C, JAVA or objective C).

Speech API 204, e.g. Microsoft's SAPI 6 or higher. This could be replaced by a proprietary cross platform architecture, like AcapelaGroup's speech architecture, that also supports Google Android, Apple iOS, etc.

Localized voices 203 that may be of various makers and languages. If the system is comprised of Windows and SAPI, then those voices should be SAPI compliant.

VideoDubber's TruDub engine 202, in which the dubbing algorithms are being processed and the control over the voices is done. TruDub is currently developed on C# and .Net 3.5, but could be ported to any Operating System.

VideoDubber's media player application 201. Instead of a proprietary application, a standard media player (e.g. Windows Media Player 9 or higher, Apple QuickTime 7 or higher, or VLC 2 or higher) may be used as a front end player that plays the video, while VideoDubber's TruDub Engine controls the video's audio and dubs the content in the background.

Figure 2A:
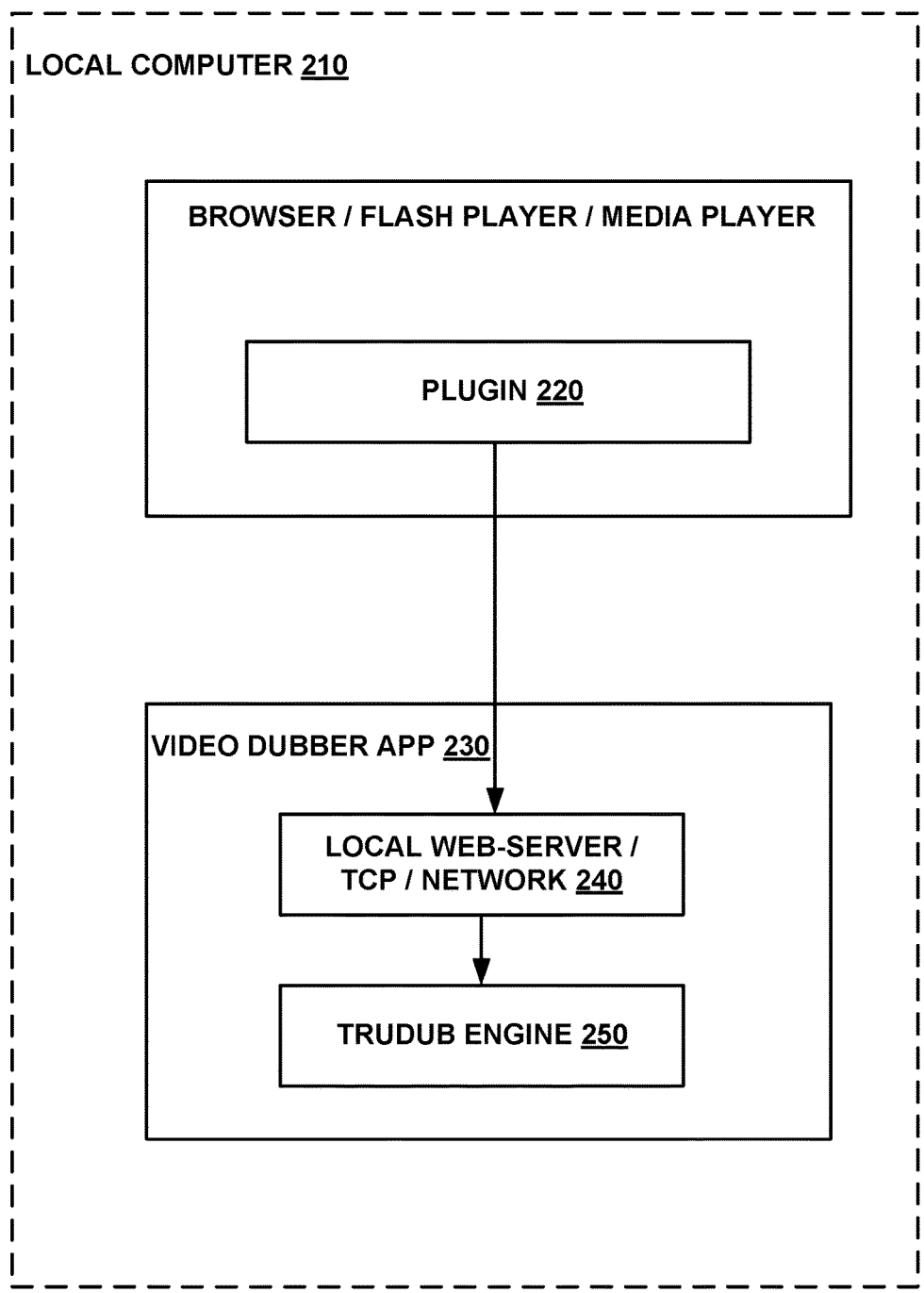
FIGS. 2A and 2B are schematic block diagram showing exemplary non limiting examples of media player units for implementing the real-time embodiment of the present invention.

FIG. 2A is a schematic block diagram showing exemplary non limiting examples of media player units for implementing the real-time embodiment of the present invention:

hooking into the computer's video card to get a video/stream/file in any media player being used plugin to existing media players hooking to html 5 web players hooking into flash players For example, a plugin 220 may be installed in any browser, to be used by any website such as YouTube.com or Ted.com.

According to this embodiment a Video Dubber application 230 is also installed on the local computer 210, including a virtual server 240 and the VideoDubber's TruDub Engine 250.

In operation, the plugin 220 receives subtitles in the target language or in another language from the website, transfers them to the video dubber application 230 via virtual server 240 and the target language dubbed audio is produced by the video dubber engine 250 and played in real time.

Figure 2B:
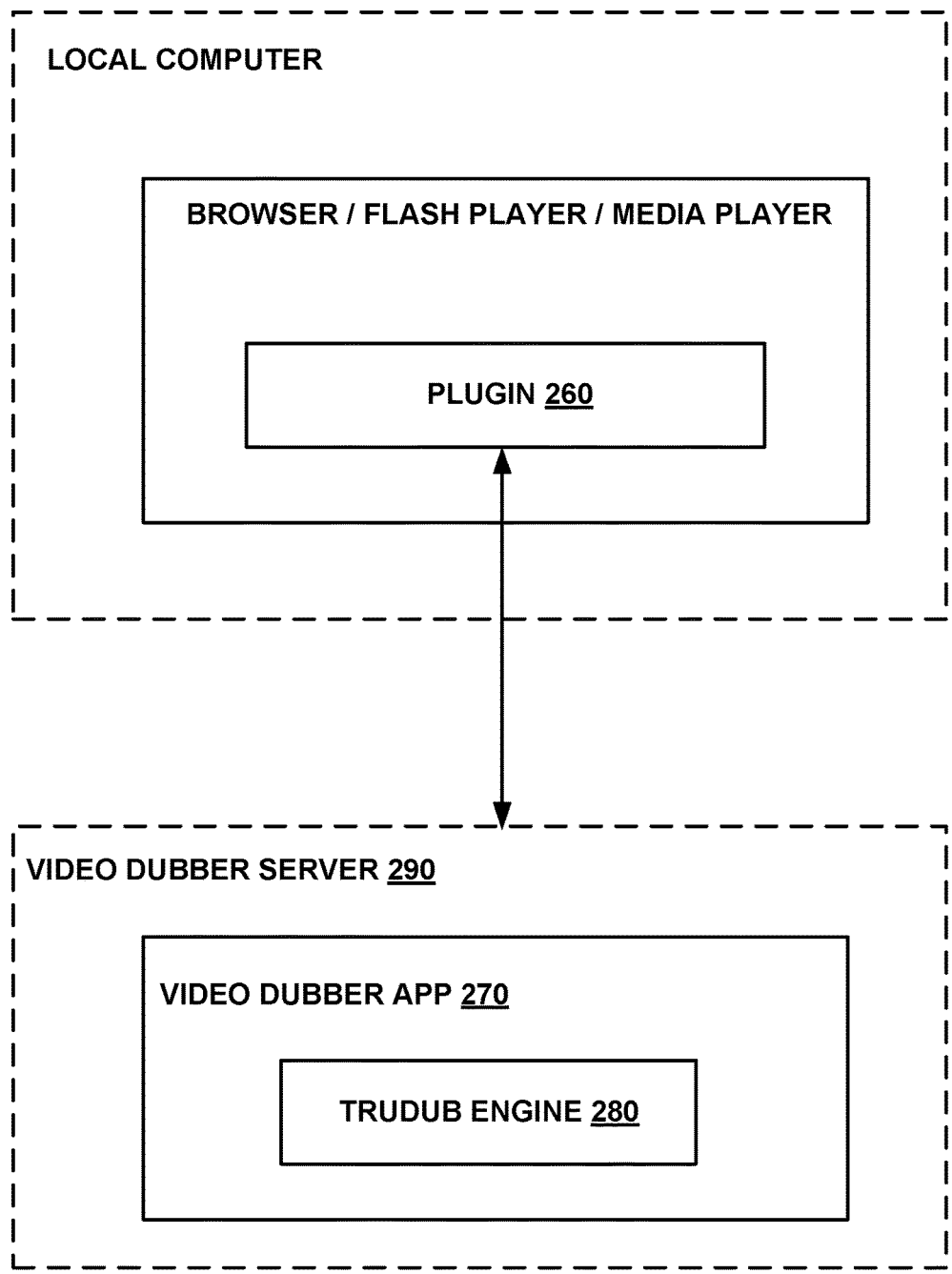

The video dubber engine 250 may be too "heavy" for some types of devices, such as smartphones. The configuration of FIG. 2B shows a "lighter" embodiment, where the video dubber application 270 resides on a server 290.

In operation, the plugin 260 receives subtitles in the target language or in another language from the website, transfers them to the video dubber application 230 on server 290 and the target language dubbed audio is produced by the video dubber engine 280 and returned as an audio stream to be played in real time.

Figure 3A:
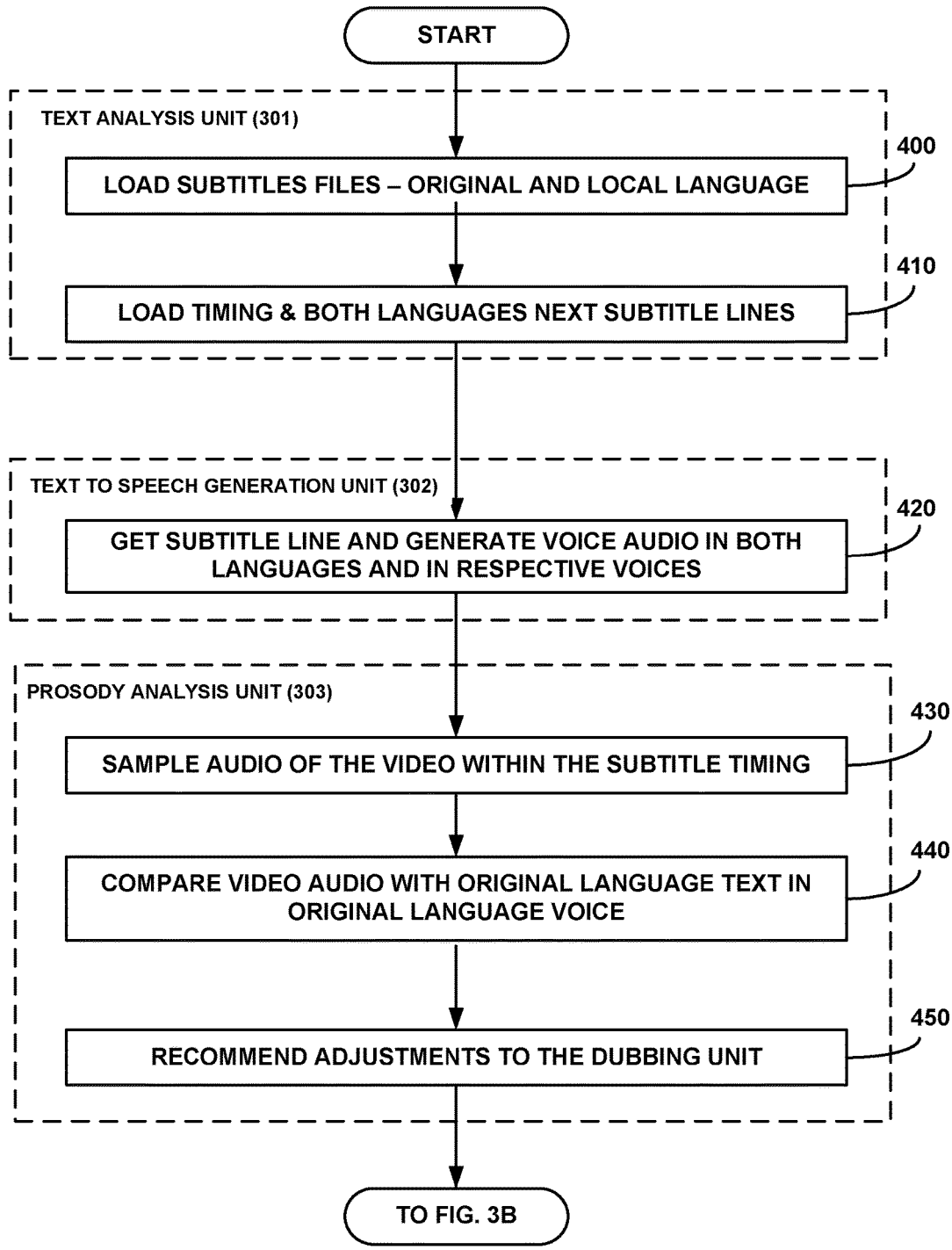
FIG. 3 is a flowchart showing the steps taken by the VideoDubber's TruDub Engine for automatic real time dubbing according to some embodiments of the present invention.

FIG. 3A+B is a flowchart showing the steps taken by the VideoDubber's TruDub Engine for automatic real time dubbing according to some embodiments of the present invention.

The process starts in step 400, in which a video file and the corresponding subtitles files (both in the original language of the video, and in the local language to which the video should be dubbed), are loaded into the Text Analysis Unit 301.

The Text Analysis Unit 301 analyses the subtitles file, and passes the appropriate text segment (e.g. the next 3 subtitle lines) to the TTS Generation Unit 302, in both languages and indicating the corresponding TTS voices that will be needed (according to the list of available voices that were pre-installed on the system), e.g. if a Swedish to French voice dubbing is needed, the system will choose 'Emil' (a Swedish male voice that AcapelaGroup developed), and Antoine (a French male voice that AcapelaGroup developed), and will pass that data along with their gender, to the TTS Generation Unit 302 for further processing. The timing data, i.e. audio duration of the relevant subtitles in the original language is also measured and transferred to the TTS Generation Unit 302.

In step 420 The TTS Generation Unit 302 generates standard TTS audio of the sentences (e.g. the current sentence and the next two sentences), in the original language, and in a corresponding TTS voice in the target language, e.g. the Swedish text using a Swedish voice, e.g. Acapela's Emil using SAPI (or similar speech engine). The resulting TTS voice audio segments are passed to the Prosody Analysis Unit 303, along with the original audio.

In step 430 The Prosody Analysis Unit 303 compares (step 440) the video's voice audio segment within the subtitle's timing to the original language standard TTS voice sound segment (generated from the original language text) by signal analysis, as known in the art.

Using the comparison, the Prosody Analysis Unit suggests (step 450) adjustments that should be made to the final dubbed voice, to be passed to the Dubbing Unit 304, e.g. the appropriate local voice gender that should be used (should it use AcapelaGroup's Antoine, a French male voice, or AcapelaGroup's Margaux, a French female voice, as a baseline voice), the speed of speech (based on the length of the resulting audio from the local language voice audio segment compared to the timing mentioned in the subtitles file and the next subtitle's timing that shouldn't be overlapped, and/or the actual timing of the original voice in the video's audio track, etc.), the trend of volume within the sentence (for emphasis), the trend of pitch within the sentence (for intonation), etc. It could also decide if it needs to merge a line or two (or three, etc.), based on the punctuation within the text, the timing between the lines, the switching between one actor's voice to another, etc. The Dubbing Unit 304 waits till it's the right time to 'speak' (based on the subtitle's timing).

In step 460 the Dubbing Unit 304 decreases the volume of the video's sound track during the dubbing process, and 'speaks' the local language text (step 470), using the improved TTS engine and the selected local voice, adjusted with the recommendations suggested by the Prosody Analysis Unit, on top of the video's audio, which are suitable for the resulting language, and optionally post-processed to adjust, for example, to the original subtitle's audio timeframe.

When the dubbing of the subtitle line is done, the volume of the video's sound track is increased back to normal volume (step 480).

Processes 420 through 480 are repeated till there are no more subtitles to be dubbed.

When the engine runs in a server configuration, the resulting audio track is merged into the original movie in a mixing step and the file generated is a video with similar quality, resolution, etc. but with a new sound track that includes now the dubbed voices.

The media server solution may be deployed as a locally hosted server within the content publisher's network, or as a Web SaaS solution for content publishers, etc. The publisher can upload a video file (e.g. .AVI file) or just an audio file (e.g. .WAV, or .MP3) with the corresponding subtitles file (e.g. .SRT or .PAC file formats) or files, and get a ready-made dubbed video, or videos (in a multi-language project), or just a new audio-only track (for re-mixing with the original video on the publisher's video suite).

Figure 4:
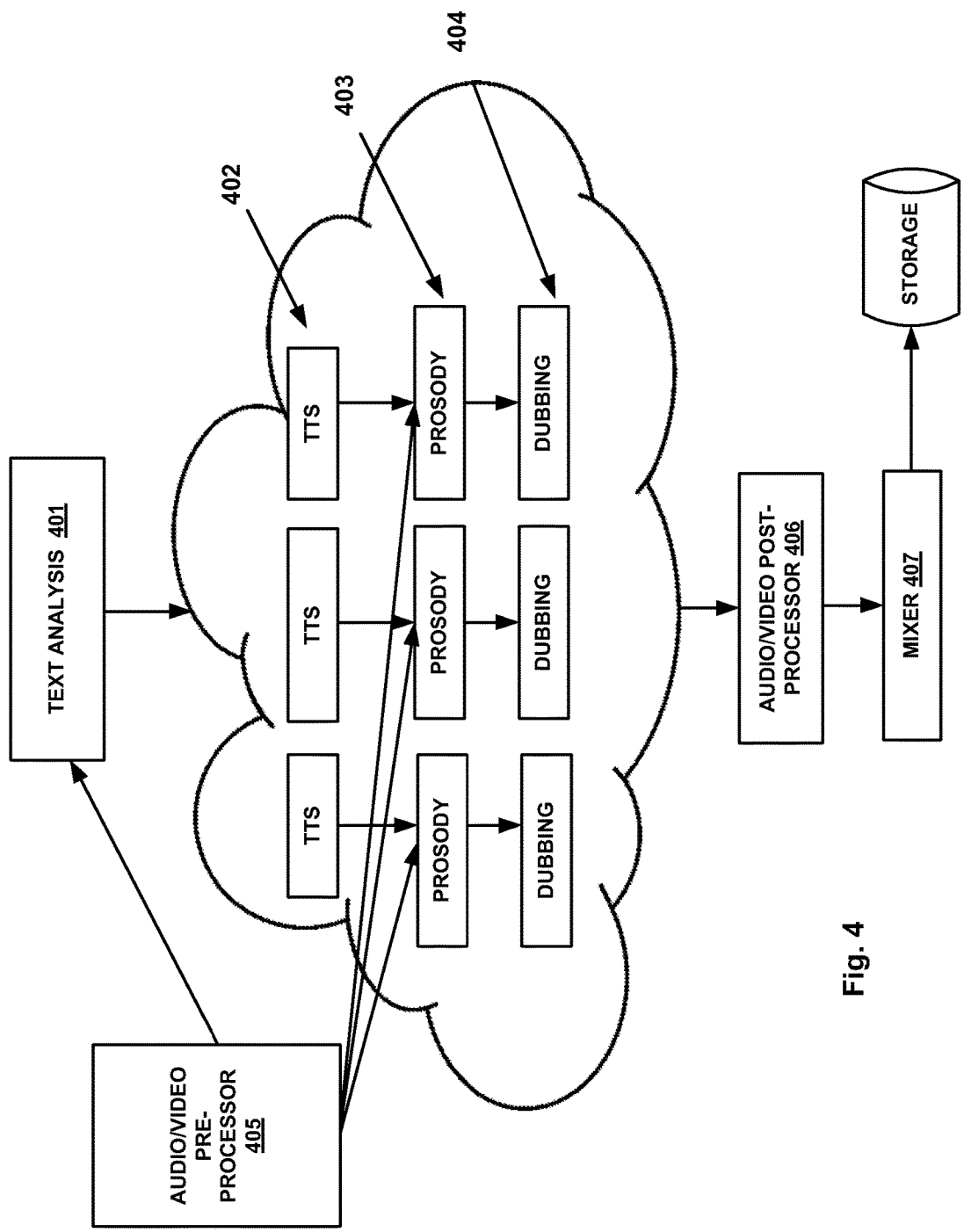
FIG. 4 presents a diagram of the automated dubbing engine in a cloud formation working in parallel processing.
Figure 5:
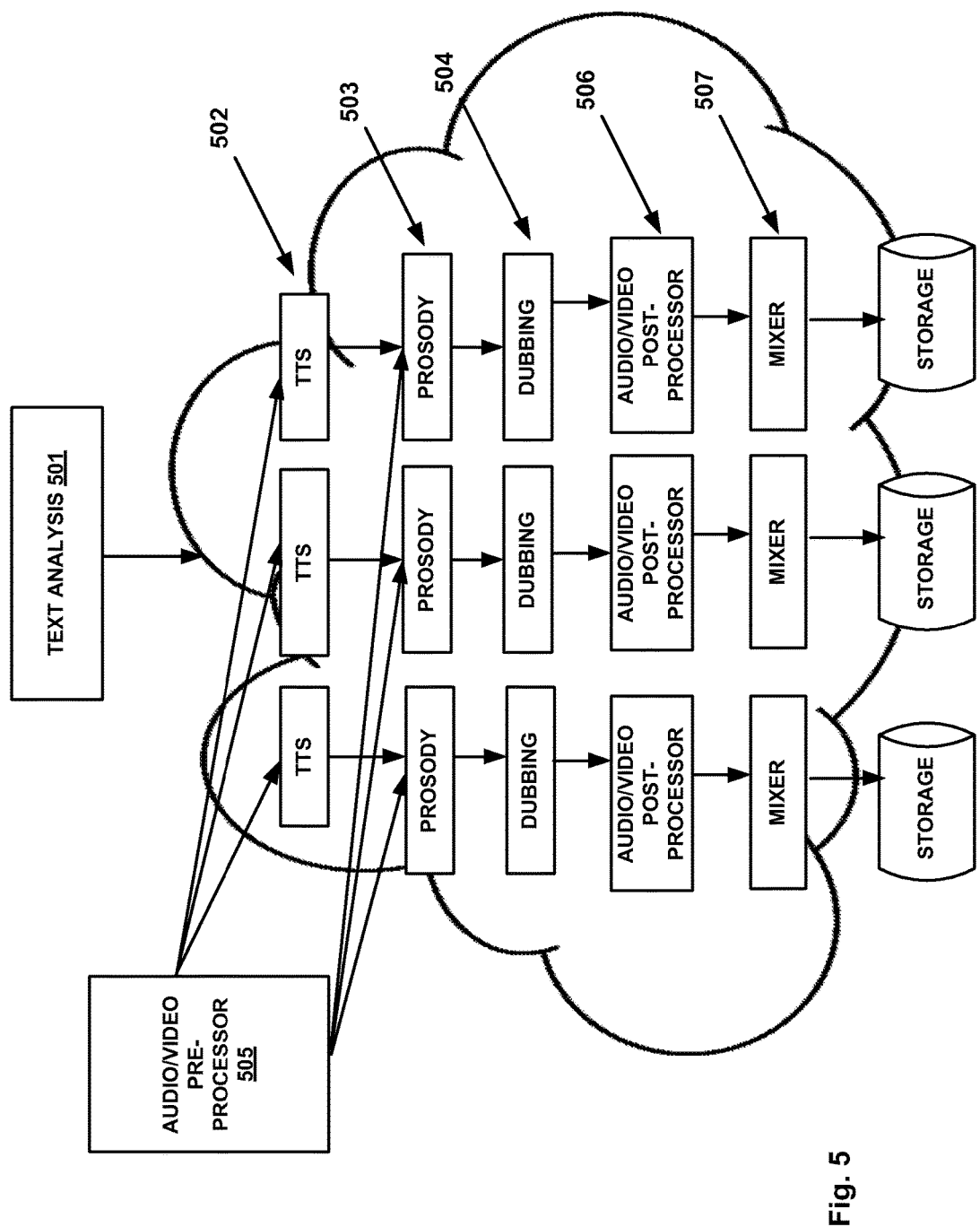
FIG. 5 presents a similar task to FIG. 4 but instead of handling a single language it shows how handling multi languages simultaneously can be done more efficiently and faster.

FIGS. 4 and 5 are schematic representations of the present invention implemented offline, in two different parallel processing architectures. The processing may be done over the internet (cloud), as shown in FIGS. 4 and 5, or using any combination of processors connected via a network.

FIG. 4 represents a parallel processing architecture useful for dividing the processing load of dubbing a single video into a single language between multiple processors (three are shown) running in parallel. Specifically, a single text analysis unit 401 receives the subtitles text files both in the original language of the video and in the local language to which the video should be dubbed, analyzes the text and passes appropriate text segment from both files (languages) to a plurality of TTS (Text To Speech) Generation Units 402. Each TTS generation unit 402 receives different text segments, according to an allocation schedule of the process. For example, segments may be allocated sequentially, one at a time, to sequential processes, in pre-determined block sizes, or in any other allocation manner known in the art.

Figure 3B:
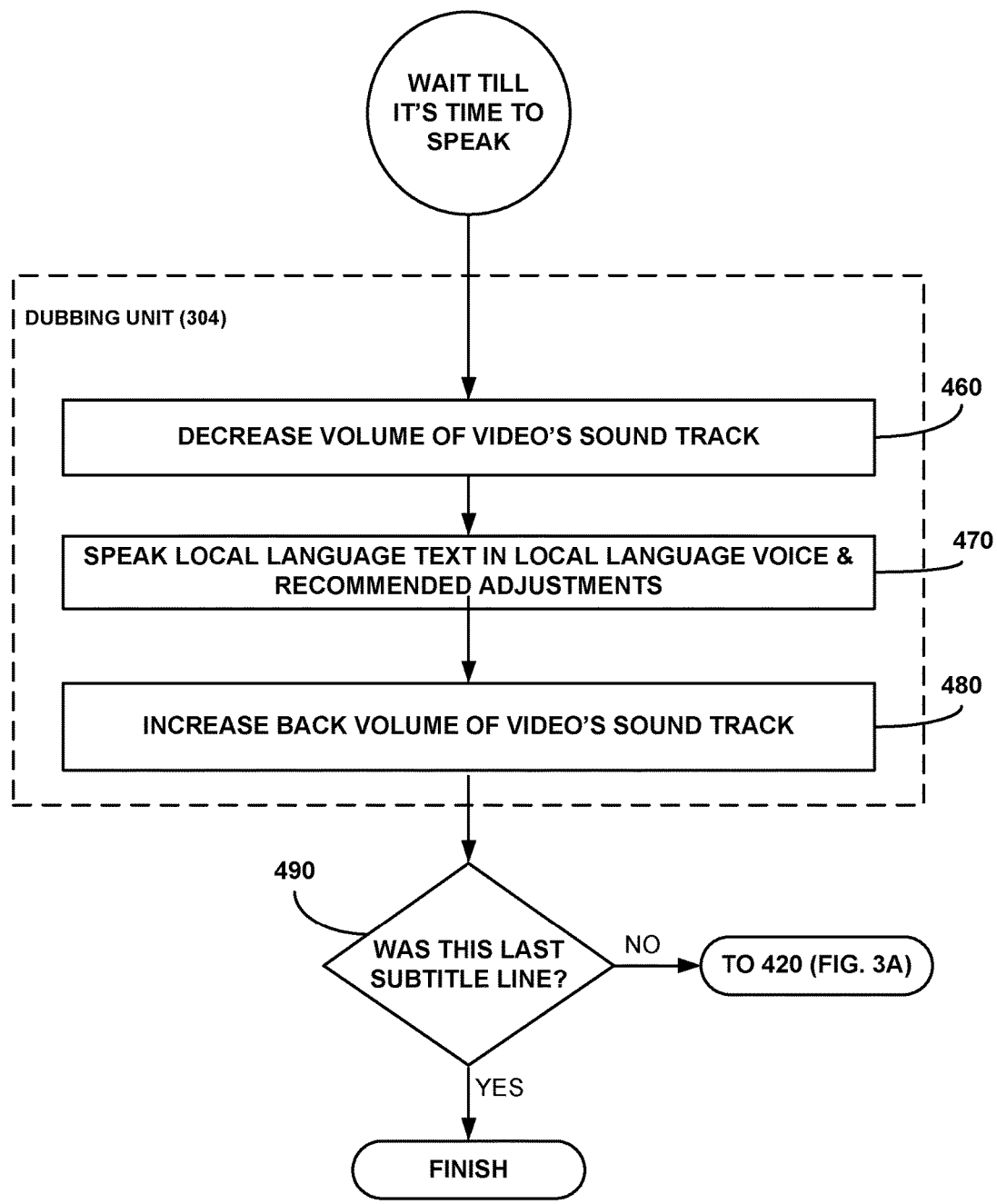

The process as described above in conjunction with FIGS. 1-3 now takes place for the different text segments, in parallel prosody units 403 (which also receive separated audio and video files from a pre-processing unit 405) and in parallel dubbing units 404.

The resulting dubbed segments are fed into an audio/video post processor 406 using an appropriate scheme for assembling the segments in the correct order. Mixer 407 merges the dubbed segments with the original video and the dubbed video is stored.

FIG. 5 represents a parallel processing architecture useful for dubbing a video into a plurality of languages (three are shown) simultaneously. Specifically, a single text analysis unit 501 receives the subtitles text files both in the original language of the video and in a plurality of local languages to which the video should be dubbed, analyzes the text and passes appropriate text segment from both files (languages) to a plurality of TTS (Text To Speech) Generation Units 502. Each TTS generation unit 502 receives the same original language text segments and different target language text segments.

The process as described above in conjunction with FIGS. 1-3 now takes place for the different languages, in parallel prosody units 503 (which also receive separated audio and video files from a pre-processing unit 505), in parallel dubbing units 504, in parallel audio/video post processors 506, in parallel audio/video post-processing units and in parallel mixing units 507.

The resulting videos dubbed into the different languages are stored in a single storage or in multiple storage facilities.

In an alternative embodiment, a single video file may be stored with multiple sound tracks of the multiple dubbed languages.

Processing

Within the Prosody Analysis Unit 103, one or several methods may be used to provide dubbing recommendation, depending on the level of 'acting' or realism desired from the dubbing result:

- In order to improve the confidence level of the gender and age recognition of the speaker in the audio sampled from the video, the unit may incorporate, for example, a subset of the GMM algorithm (SPEAKER RECOGNITION USING GMM by G. Suvarna Kumar et. al./International Journal of Engineering Science and Technology-Vol. 2(6), 2010, 2428-2436-http://www.ijest.info/docs/IJEST10-02-06-112.pdf. Combining Five Acoustic Level Modeling Methods for Automatic Speaker Age and Gender Recognition, by Ming Li, Chi-Sang Jung, Kyu J. Han (from the Signal Analysis and Interpretation Laboratory, Department of Electrical Engineering, University of Southern California, Los Angeles, USA; School of Electrical and Electronic Engineering, Yonsei University, Korea) sail.usc.edu/aigaion2/index.php/attachments/single/385.
- In order to recognize where the voice starts and ends, to minimize process efforts, an FFT algorithm such as, for example, described in U.S. Pat. No. 7,672,842, or an alternative algorithm may be used.
- In order to analyze and assign the right pitch and intonation to the spoken voice, as well as which voice from the voices available in the local language to be used, PRAAT (Hands-on tutorial: Using Praat for analyzing a speech corpus, by Mietta Lennes, http://www.helsinki.fi/~lennes/vispp/lennes palmse05.pdf) and Fujisaki (Intonation Recognition for Indonesian Speech Based on Fujisaki Model, by Nazrul Effendy, Ekkarit Maneenoi, Patavee Charnvivit, Somchai Jitapunkul—http://mirlab.org/conference papers/International Conference/ICSLP % 202004/contents/FrB pdf/FrB202p/FrB202p.2p324.pdf) algorithms may be used.
- The Fujisaki algorithm may also be used to identify the emotion and then implement a ready-made emotion (that is more suitable for the local culture) with the local voice.

All the references are incorporated herein by reference.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs).

An ASIC may be designed on a single silicon chip to perform the method of the present invention. The ASIC can include the circuits to perform the logic, microprocessors, and memory necessary to perform the method of the present invention. Multiple ASICs may be envisioned and employed as well for the present invention.

A computer or machine-readable medium includes any item for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A system for automatically dubbing a video in a first language into a second language, comprising:
    an audio/video pre-processor constructed and arranged to provide separate original audio and video files of the same media;
    a text analysis unit constructed and arranged to receive a first text file of the video's subtitles in the first language and a second text file of the video's subtitles in the second language, said text analysis unit further constructed and arranged to re-divide said first and second text files into text sentences;
    a text-to-speech unit constructed and arranged to receive said text sentences in said first and second languages from said text analysis unit and produce therefrom first and second standard TTS spoken sentences;
    a prosody unit constructed and arranged to receive said first and second spoken sentences, said separated audio file and timing parameters and produce therefrom dubbing recommendations; and
    a dubbing unit constructed and arranged to receive said second spoken sentence and said recommendations and produce therefrom an automatically dubbed sentence in said second language.

2. The system of claim 1, further comprising a speech-to-text unit constructed and arranged to convert said audio file into said first text file.

3. The system of claim 1, wherein said producing dubbing recommendations comprises comparing the sentence in said first TTS voice with said sentence in the original audio.

4. The system of claim 3, wherein said dubbing recommendations comprise at least one of: volume, intonation, speed, audio distribution, time-stamp, gender and actor.

5. The system of claim 4, further comprising a feelings intonations library and further constructed and arranged to find a match for the intonation in said original audio sentence in said library and attaching feeling descriptors to said recommendations.

6. The system of claim 1, wherein said dubbing unit is further constructed and arranged to perform asymmetric time adjustments to said dubbed sentence.

7. The system of claim 6, wherein said asymmetric time adjustments comprise different scaling factors for words and gaps between words.

8. The system of claim 1, further comprising a translation unit constructed and arranged to provide said second language text sentences.

9. The system of claim 1, wherein said video comprises closed 'burned' captions, the system further comprising an OCR unit constructed and arranged to recognize said 'burned' captions and recreate therefrom the subtitles file.

10. A real-time automatic video dubbing system incorporated in a media player, comprising:
   a text analysis unit constructed and arranged to receive a first text file of the video's subtitles in a first language and a second text file of the video's subtitles in a second language, said text analysis unit further constructed and arranged to re-divide said first and second text files into text sentences;
   a text-to-speech unit constructed and arranged to receive said text sentences in said first and second languages from said text analysis unit and produce therefrom first and second standard TTS spoken sentences;
   a prosody unit constructed and arranged to receive said first and second spoken sentences, an original audio file and timing parameters and produce therefrom dubbing recommendations; and
   a dubbing unit constructed and arranged to receive said second spoken sentence and said recommendations, produce therefrom an automatically dubbed sentence in said second language, decrease the volume of the original audio and play said dubbed sentence.

11. An offline system for automatically dubbing a video in a first language into a second language, comprising:
   an audio/video pre-processor constructed and arranged to provide separate original audio and video files of the same media;
   a text analysis unit constructed and arranged to receive a first text file of the video's subtitles in the first language and a second text file of the video's subtitles in the second language, said text analysis unit further constructed and arranged to re-divide said first and second text files into text sentences;
   a plurality of text-to-speech (TTS) units constructed and arranged to receive different allocations of said text sentences in said first and second languages from said text analysis unit and produce therefrom first and second standard TTS spoken sentences;
   a plurality of respective prosody units constructed and arranged to receive from their respective TTS units said first and second spoken sentences, said separated audio file and timing parameters and produce therefrom dubbing recommendations;
   a plurality of respective dubbing units constructed and arranged to receive said second spoken sentences from their respective prosody units and said recommendations and produce therefrom a plurality of automatically dubbed sentences in said second language;
   an audio/video post-processing unit constructed and arranged to assemble the dubbed sentences from said plurality of dubbing units in a correct order; and
   a mixing unit constructed and arranged to merge said assembled dubbed sentences with the original video.

12. An offline system for automatically dubbing a video in a first language into a plurality of second languages, comprising:
   an audio/video pre-processor constructed and arranged to provide separate original audio and video files of the same media;
   a text analysis unit constructed and arranged to receive a first text file of the video's subtitles in the first language and a plurality of second text files of the video's subtitles in the plurality of second languages, said text analysis unit further c constructed and arranged to re-divide said first and second text files into text sentences;
   a plurality of text-to-speech (TTS) units, each constructed and arranged to receive said text sentences in said first language and in one of said second languages from said text analysis unit and produce therefrom first and second standard TTS spoken sentences;
   a plurality of respective prosody units constructed and arranged to receive from their respective TTS units said first and second spoken sentences, said separated audio file and timing parameters and produce therefrom dubbing recommendations;
   a plurality of respective dubbing units constructed and arranged to receive said second spoken sentences from their respective prosody units and said recommendations and produce therefrom a plurality of automatically dubbed sentences in said second language; and
   a plurality of mixing units constructed and arranged to merge said assembled dubbed sentences with the original video.

13. A method of automatically dubbing a video in a first language into a second language, comprising:
   providing separate original audio and video files of the same media;
   receiving a first text file of the video's subtitles in the first language and a second text file of the video's subtitles in the second language and dividing said first and second text files into text sentences;
   producing first and second standard TTS spoken subtitles from said first and second language subtitles;
   producing dubbing recommendations from said first and second spoken subtitles, said separated audio file and timing parameters; and
   producing an automatically dubbed sentence in said second language from said second spoken subtitles and said recommendations.

14. The method of claim 13, further comprising converting said audio file into said first text file using speech to text technology.

15. The method of claim 13, wherein said producing dubbing recommendations comprises comparing the sentence in said first TTS voice with said sentence in the original audio.

16. The method of claim 13, wherein said dubbing recommendations comprise at least one of: volume, intonation, speed, audio distribution, time-stamp, gender and actor.

17. The method of claim 14, further comprising finding a match for intonation in said original audio sentence in a feelings intonations library and attaching feeling descriptors to said recommendations.

18. The method of claim 13, further comprising performing asymmetric time adjustments to said dubbed sentence.

19. The method of claim 18, wherein said asymmetric time adjustments comprise different scaling factors for words and gaps between words.

20. The method of claim 13, further comprising providing said second language text sentences from a translation unit.

21. The method of claim 13, wherein said video comprises closed 'burned' captions, the method further comprising recognizing said 'burned' captions and creating therefrom a text file.

22. In a media player, a method of real-time automatic video dubbing, comprising:
   providing separate original audio and video files of the same media;
   receiving a first text file of the video's subtitles in a first language and a second text file of the video's subtitles in a second language and re-divide said first and second text files into text sentences;
   producing first and second standard TTS spoken sentences from said text sentences in said first and second languages;
   producing dubbing recommendations from said first and second spoken sentences, said separated audio file and timing parameters;
   automatically producing a dubbed sentence in said second language from said second spoken sentence and said recommendations; and
   decreasing the volume of the original audio and playing said dubbed sentence.

23. A method of automatically dubbing a video in a first language into a second language, comprising:
   providing separate original audio and video files of the same media;
   receiving a first text file of the video's subtitles in the first language and a second text file of the video's subtitles in the second language and dividing said first and second text files into text sentences;
   dividing said text sentences in said first and second languages between a plurality of parallel text-to-speech (TTS) processes and producing therefrom a plurality of first and second standard TTS spoken sentences;
   producing in parallel a plurality of dubbing recommendations from said plurality of first and second spoken sentences, said separated audio file and timing parameters;
   producing a plurality of automatically dubbed sentences in said second language from said plurality of second spoken sentences and said plurality of dubbing recommendations;
   assembling the plurality of dubbed sentences in a correct order; and
   merging said assembled dubbed sentences with the original video.

24. A method of automatically dubbing a video in a first language into a plurality of second languages, comprising:
   providing separate original audio and video files of the same media;
   receiving a first text file of the video's subtitles in the first language and a plurality of second text files of the video's subtitles in the plurality of second languages and dividing said first and second text files into text sentences;
   producing in parallel a plurality of first and second standard TTS spoken sentences from said text sentences in said first language and in said second languages;
   producing in parallel a plurality of dubbing recommendations from said first and second spoken sentences, said separated audio file and timing parameters;
   producing in parallel a plurality of automatically dubbed sentences in said second languages from said second spoken sentences and said recommendations; and
   merging in parallel said assembled dubbed sentences with the original video.

* * * * *